(12) United States Patent
Noguchi et al.

(10) Patent No.: US 6,765,177 B2
(45) Date of Patent: Jul. 20, 2004

(54) LAMINATED GLASS SHEET FOR WINDSHIELD

(75) Inventors: Tatsuya Noguchi, Osaka (JP); Satoshi Furusawa, Osaka (JP)

(73) Assignee: Nippon Sheet Glass Company, Limited, Osaka (JP)

( * ) Notice: Subject to any disclaimer, the term of this patent is extended or adjusted under 35 U.S.C. 154(b) by 0 days.

(21) Appl. No.: 10/351,192

(22) Filed: Jan. 24, 2003

(65) Prior Publication Data

US 2003/0150848 A1 Aug. 14, 2003

(30) Foreign Application Priority Data

Jan. 25, 2002 (JP) ........................................ 2002-017768

(51) Int. Cl.$^7$ ................................................ B60L 1/02
(52) U.S. Cl. ........................................ 219/203; 428/38
(58) Field of Search ................................ 219/203, 522, 219/547; 428/77, 209, 38; 392/439

(56) References Cited

U.S. PATENT DOCUMENTS

| | | | | |
|---|---|---|---|---|
| 3,928,748 A | * | 12/1975 | Sauer | 219/522 |
| 4,725,710 A | * | 2/1988 | Ramus et al. | 219/203 |
| 5,119,467 A | * | 6/1992 | Barsky et al. | 392/439 |
| 5,414,240 A | * | 5/1995 | Carter et al. | 219/203 |
| 5,418,025 A | * | 5/1995 | Harmand et al. | 428/38 |
| 5,493,102 A | * | 2/1996 | Takase et al. | 219/547 |
| 5,620,799 A | | 4/1997 | Sauer | |
| 5,845,342 A | * | 12/1998 | Park | 2/424 |
| 5,867,129 A | | 2/1999 | Sauer | |
| 6,042,924 A | * | 3/2000 | Paulus et al. | 428/77 |
| 6,042,932 A | * | 3/2000 | Ingles et al. | 428/209 |
| 6,352,754 B1 | | 3/2002 | Frost et al. | |
| 6,472,636 B1 | * | 10/2002 | Baldwin | 219/203 |
| 6,492,619 B1 | * | 12/2002 | Sol | 219/203 |
| 6,559,419 B1 | * | 5/2003 | Sol et al. | 219/203 |
| 2002/0094407 A1 | | 7/2002 | Frost et al. | |

FOREIGN PATENT DOCUMENTS

| | | | |
|---|---|---|---|
| DE | 3708577 | 9/1988 | |
| DE | 19508042 | 10/1995 | |
| EP | 2-46683 | 2/1990 | |
| JP | 02-046683 | 2/1990 | |
| JP | 7-309210 | 11/1995 | |
| JP | 8-210042 | 8/1996 | |
| JP | 8-250915 | 9/1996 | |
| JP | 2001048602 | * 2/2001 | ........... C03C/27/12 |
| WO | 98/47703 | 10/1998 | |
| WO | 00/72634 | 11/2000 | |
| WO | 00/72635 | 11/2000 | |
| WO | 01/68395 | 9/2001 | |

* cited by examiner

Primary Examiner—Denise Pothier
Assistant Examiner—L Fastovsky
(74) Attorney, Agent, or Firm—Merchant & Gould P.C.

(57) ABSTRACT

The present invention provides a laminated glass sheet for windshield that includes a transparent conductive film and enables ITS communication. The laminated glass sheet includes a first bus-bar aranged along an upper end of the laminated glass sheet, and a second bus-bar arranged along a lower end of the laminated glass sheet, and the first busbar includes a protruding portion that extends toward the second bus-bar, and the transparent conductive film is not formed in a concave portion that is formed by the protruding portion. Since the concave portion can be used for the communication, the conductive film may be free from an opening.

5 Claims, 6 Drawing Sheets

LAMINATED GLASS SHEET FOR WINDSHIELD

BACKGROUND OF THE INVENTION

1. Field of the Invention

The present invention relates to a laminated glass sheet for a windshield with a transparent conductive film for an electric heating function and a heat shielding function. In particular, the present invention relates to a laminated glass sheet for a windshield that enables ITS (Information Technology System) communication such as ETC (Electronic Toll Collections) and VICS (Vehicle Information and Communication System).

2. Description of the Related Art

For example, JP7 (1995)-309210A discloses a heating device for electrically heating a windshield for an electric automobile, which includes a transparent conductive film and bus-bars on upper and lower sides of the windshield. This heating device is provided for the purpose of removing a frost or a fog generated on the windshield. The transparent conductive film is usually provided at least in a region corresponding to a field of view of the windshield to ensure safety driving.

In the case of using a transparent conductive film containing a metal layer such as a silver (Ag) layer, a heat-shielding function as well as a heating function is obtained. However, the conductive film containing a metal film provides an electromagnetic radiation shielding function. This makes it difficult to conduct communication such as ETC and VICS.

JP8 (1996)-210042A discloses, as a windowpane capable of transmitting an electromagnetic radiation, a windowpane having a reflection ability and/or an absorption ability of an electromagnetic ray, except for a predetermined region for transmitting an electromagnetic signal.

JP8 (1996)-250915A discloses, as a glass sheet for an automobile having a conductive layer, a glass sheet for an automobile covered with a transparent conductive layer having slit-shaped gaps with a length represented by the function of a microwave radiation wavelength.

However, in JP8 (1996)-210042A and JP8 (1996)-250915A, a region for transmitting an electromagnetic ray is provided in a field of the driver's view. Therefore, the region tends to makes the heat-shielding function and the electric heating function insufficient.

SUMMARY OF THE INVENTION

The present invention provides a laminated glass sheet for a windshield that includes at least two glass sheets, at least one thermoplastic resin film provided between the at least two glass sheets, and a transparent conductive film and bus-bars for supplying electric power to the transparent conductive film. The transparent conductive film and the bus-bars are formed on a surface of one of the glass sheets. The bus-bars include a first bus-bar arranged along an upper end of the laminated glass sheet, and a second bus-bar arranged along a lower end of the laminated glass sheet. The first bus-bar includes a protruding portion that extends toward the second bus-bar. In other words, the first bus-bar includes an inset that extends toward the second bus-bar. The transparent conductive film is not formed in a concave portion that is formed by the protruding portion.

The concave portion enables the ITS communication. The transparent film may be free from an opening for transmitting an electromagnetic ray. Thus, a heat-shielding function and/or an electric heating function can be obtained in the whole area for a driver's view.

DESCRIPTION OF THE PREFERRED EMBODIMENTS

In one embodiment of the present invention, the upper bus-bar has a downward convex shape, for example, at the center thereof. The upper bus-bar partially shifts downward to make the convex shape, and the transparent conductive film is not provided in a concave portion that is formed by the shift of the bus-bar or in a region between the shifted bus-bar and the upper edge of the laminated glass sheet.

The upper bus-bar may be formed by printing in a predetermined pattern. The region where the transparent conductive film is not formed may be obtained by not forming a transparent conductive film selectively by masking or by partially removing a formed transparent conductive film by etching or the like.

The laminated glass sheet according to the present invention further may include a ceramic pattern, and the ceramic pattern is formed in a peripheral portion of the laminated glass sheet. The ceramic print should be formed so as to cover at least the first bus-bar. The ceramic print preferably has an inverted trapezoid shape that covers the protruding portion of the bas-bar. It is preferable that the ceramic print has an opening in the concave portion.

The transparent conductive film may include a metal layer. This film preferably further includes a conductive oxide layer such as an indium tin oxide (ITO) layer.

Figure 1:
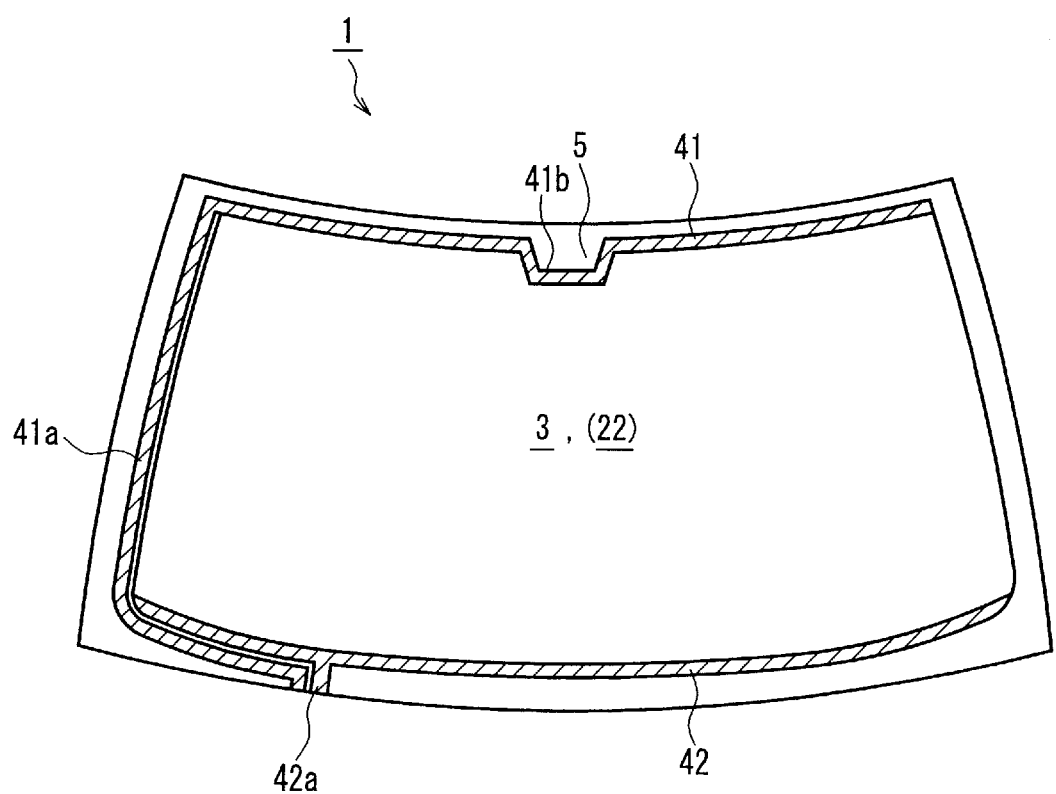
FIG. 1 is a view illustrating a basic configuration of the bus-bars for the present invention.

FIG. 1 is a plan view of a laminated glass sheet 1 for a windshield seen from the outside of an automobile. In FIG. 1, a single glass sheet 21 on the outside of the automobile, which constitutes the laminated glass sheet 1 as seen in FIG. 2A, is omitted.

In the laminated glass sheet 1, upper and lower bus-bars 41 and 42 are provided on a single glass sheet 22 to be arranged to face the inside of the automobile. A transparent conductive film 3 is formed in a region between the upper bus-bar 41 and the lower bus-bar 42. The upper bus-bar 41 detours to have a downward convex portion 41b where a concave portion 5 is formed. The convex portion 41b defines an inverted isosceles trapezoid. In a region between the convex portion 41b and the upper edge of the glass sheet 22 where the conductive film 3 is not formed functions as an opening for an electromagnetic wave.

Power supply patterns 41a and 42a of the bus-bars 41 and 42 are extended to one position of the lower end of the laminated glass sheet, so that a wiring operation for the power supply lines is easier.

Figure 2A:
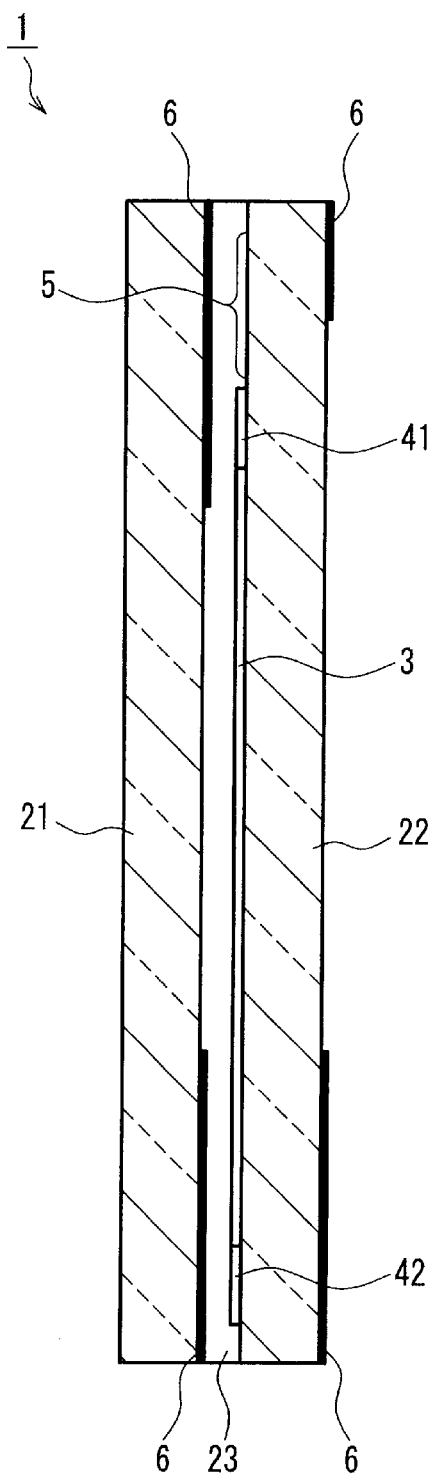
FIGS. 2A and 2B are a cross-sectional view and a partial cross-sectional view of examples of the laminated glass sheet of the present invention, respectively.
Figure 2B:
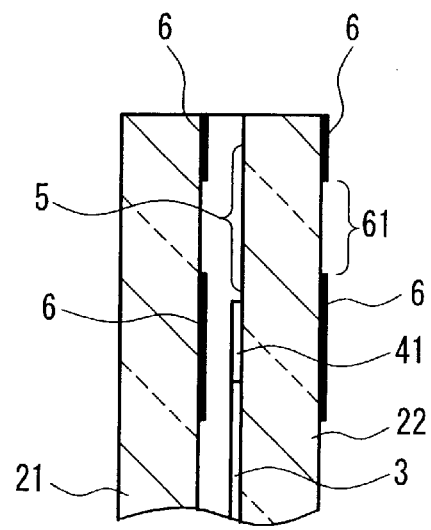

FIG. 2A shows an example in which a ceramic print 6 is provided even in a concave portion 5. FIG. 2B shows an example in which a ceramic print 6 has an opening 61 in the concave portion 5. When the ceramic print 6 has a composition free from metal, there is no need for forming the opening 61.

The laminated glass sheet according to the present invention may be produced by the following processes.

(1) Two glass sheets with a predetermined shape are cut out from a larger material sheet.
(2) The end faces of the glass sheets are ground.
(3) One of the glass sheets to be disposed inside the automobile is provided with bus-bars by printing.
(4) A ceramic print is printed onto peripheral portions of the two glass sheets.
(5) The two glass sheets are overlapped with each other and bent by their own weight (sag-bending).
(6) Masking is provided partially on one of the glass sheets to be disposed inside the automobile, and a transparent conductive film is formed by sputtering.
(7) The two glass sheets are attached to each other via a polyvinyl butyral (PVB) film that is a thermoplastic resin film to form a laminated glass sheet.

(Method for Producing a Transparent Conductive Film)

Figure 3:
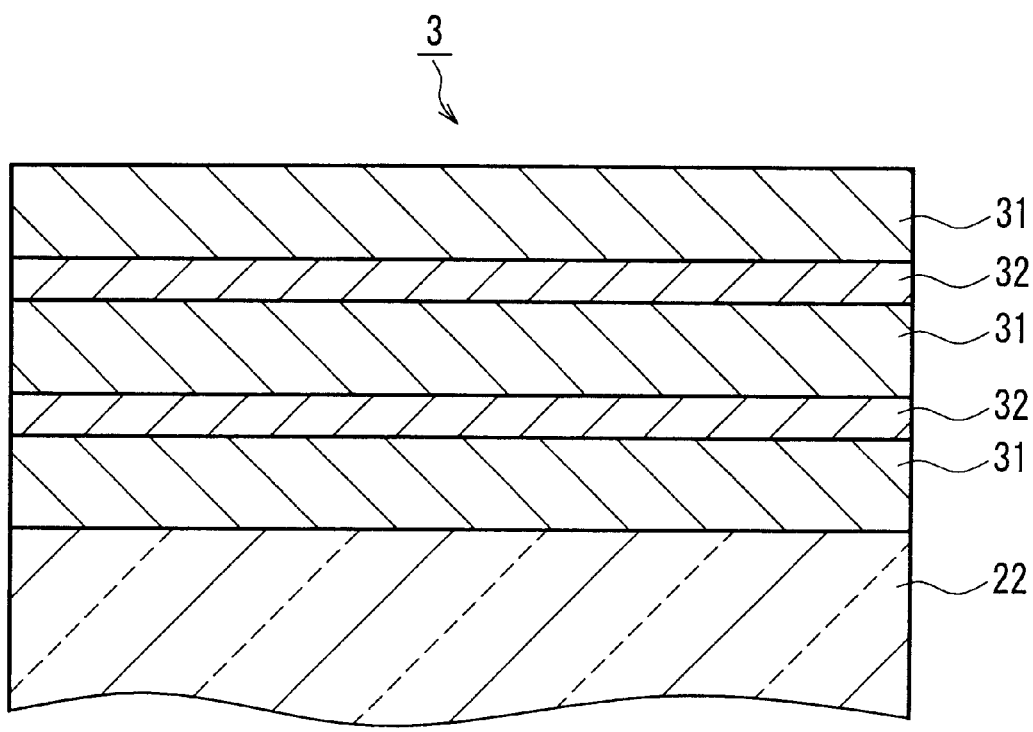
FIG. 3 is a cross-sectional view of a transparent conductive film applicable to the laminated glass sheet of the present invention.

As the transparent conductive film 3 that can be used in the present invention, any well-known film can be used such as the following example (see FIG. 3).

The transparent conductive film is obtained by successively stacking a first metal oxide layer, a first metal layer, a second metal oxide layer, a second metal layer, and a third metal oxide layer on a glass sheet 22 by sputtering. The metal oxide layers 31 may be made of conductive oxide such as indium tin oxide (ITO). The metal layers 32 may be Ag layers.

For example, the basic layer thickness of the conductive film is as follows:

First metal oxide layer: 20 to 40 nm

First Ag layer: 7 to 11 nm

Second metal oxide layer: 60 to 100 nm

Second Ag layer: 7 to 11 nm

Third metal oxide layer: 20 to 40 nm

By using a D.C. sputtering apparatus of an in-line type, five films of the transparent conductive film can be formed successively on a glass sheet. Regarding three examples of basic film configurations, Table 1 shows the flow rates of Ar and $O_2$, the discharge current, and the thickness of a film to be formed.

TABLE 1

Film-formation condition of a transparent conductive film

| Sample | Film-formation condition | ITO1 | Ag1 | ITO2 | Ag2 | ITO3 |
|---|---|---|---|---|---|---|
| Basic film configuration 1 | Ar flow rate (SCCM) | 98 | 98 | 98 | 98 | 98 |
| | $O_2$ flow rate (SCCM) | 10 | 0 | 10 | 0 | 10 |
| | Discharge current (A) | 6 | 0.9 | 6 | 0.9 | 6 |
| | Design film thickness (nm) | 28 | 8 | 70 | 10 | 28 |
| Basic film configuration 2 | Ar flow rate (SCCM) | 100 | 100 | 100 | 100 | 100 |
| | $O_2$ flow rate (SCCM) | 30 | 0 | 30 | 0 | 30 |
| | Discharge current (A) | 30 | 15 | 30 | 15 | 30 |

TABLE 1-continued

Film-formation condition of a transparent conductive film

| Sample | Film-formation condition | ITO1 | Ag1 | ITO2 | Ag2 | ITO3 |
|---|---|---|---|---|---|---|
| | Design film thickness (nm) | 40 | 7 | 100 | 9 | 40 |
| Basic film configuration 3 | Ar flow rate (SCCM) | 100 | 100 | 100 | 100 | 100 |
| | $O_2$ flow rate (SCCM) | 30 | 0 | 30 | 0 | 30 |
| | Discharge current (A) | 30 | 15 | 30 | 15 | 30 |
| | Design film thickness (nm) | 36 | 8 | 90 | 10 | 36 |

The single glass sheet 22, on which a transparent conductive film with the above-mentioned basic film configuration was formed, was attached to another single glass sheet 21 on the outside of an automobile via a PVB intermediate film 23 (e.g. thickness: 0.76 mm). Thus, a laminated glass sheet was obtained. The basic film configurations 1, 2 and 3 correspond to Basic Examples 1, 2 and 3. In Basic Examples 1, 2 and 3, a clear glass sheet (2 mm) and a green glass sheet (2 mm) were used as glass sheets.

Furthermore, Basic Example 4 was obtained by using the basic film configuration 1, and two pieces of clear glass (2 mm).

Table 2 shows the results of optical characteristics (transparency and reflection property) in the above-mentioned basic examples. Table 2 also shows the optical characteristics of glass sheets and laminated glass sheets on which a transparent conductive film is not formed.

TABLE 2

Transparency of laminated glass using a basic film configuration

| Sample | Transmittance with respect to visible light (%) | Transmittance with respect to solar radiation (%) | Color tone a | b |
|---|---|---|---|---|
| Basic Example 1 | 72.1 | 37.0 | −6.4 | 5.0 |
| Basic Example 2 | 72.4 | 37.8 | −5.1 | 3.7 |
| Basic Example 3 | 71.7 | 34.4 | −6.2 | 2.1 |
| Basic Example 4 | 76.5 | 40.4 | −4.1 | 2.9 |
| Green glass (2 mm) | 85.3 | — | −2.9 | 0.4 |
| Clear glass (2 mm) | 90.6 | — | −0.6 | 0.1 |
| Gleen + PVB + Clear | 83.7 | 62.2 | −3.9 | 1.2 |
| Clear + PVB + Clear | 88.8 | 76.7 | −1.3 | 0.3 |

As is understood from Table 2, any of the basic examples exhibited an excellent solar-radiation shielding function (transmittance: 40% or less) while exhibiting a transmittance of 70% or more with respect to visible light, which is one standard of a windshield for an automobile. The color tone thereof was neutral.

(Opening for ITS Communication)

For example, an opening of a transmitter/receiver for ITS communication such as VICS and ETC should be formed as follows.

(Formation of an Upper Bus-Bar)

During Process (3) among the above-mentioned basic processes of the laminated glass, an upper bus-bar, for example, with the shape as shown in FIG. 1 may be printed. If a portion that is to have a protruding shape is placed behind a driver's mirror relative to the driver side, a field of view is hardly blocked, which is preferable.

Figure 4:
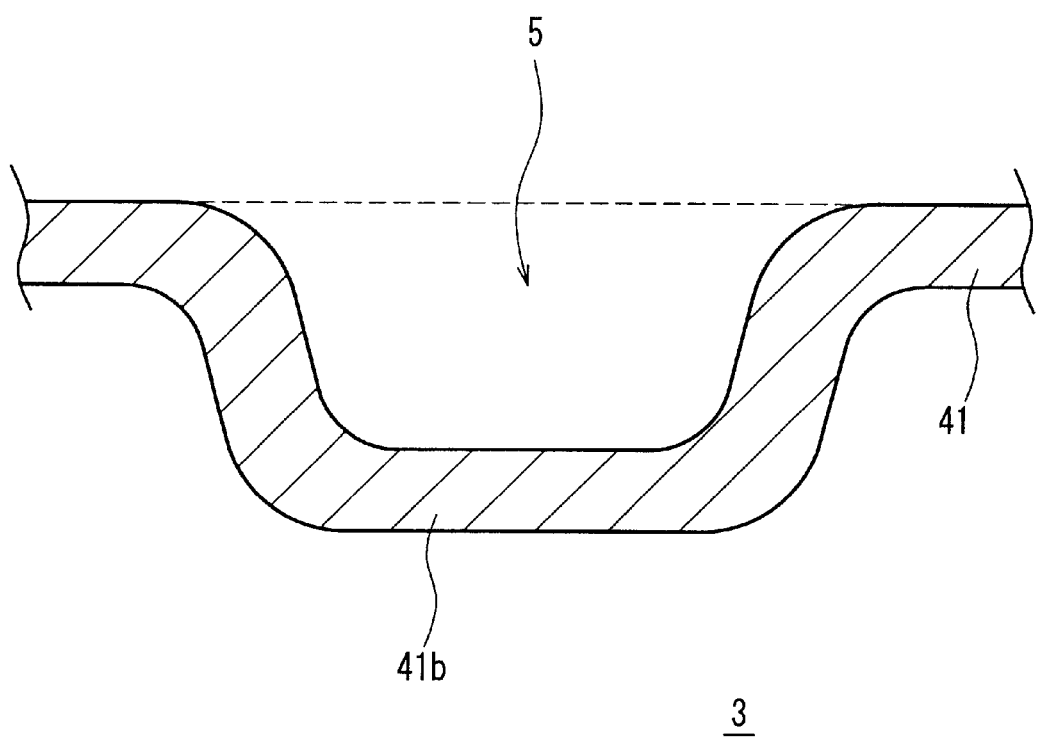
FIG. 4 is an enlarged view of a protruding portion of an upper bus-bar in the present invention.

As the specific protruding shape, the shape obtained by inverting an isosceles trapezoid as shown in FIG. 1 is preferable. The purpose of this is to alleviate the tendency of a current to concentrate at a corner of the downward convex portion. Furthermore, as shown in FIG. 4, a corner portion of the protruding portion is preferably formed into a curve.

(Method for Forming a Transparent Conductive Film)

In a region surrounded by the downward convex portion of the upper bus-bar and the outer edge of the laminated glass, a transparent conductive film should not be formed. The method thereof will be illustrated as follows.

Masking Method

In the course of forming a transparent conductive film, the region where it is not desired to form the conductive film is masked, and thereafter, a metal oxide film and an Ag film may be stacked alternately by sputtering as described above.

Etching Method

First, a transparent conductive film is formed over the entire surface of a glass sheet. Thereafter, the transparent conductive film in the region where it is desired to remove the conductive film may be removed selectively with an etchant such as phosphoric acid.

The region where the transparent conductive film is not formed is used as an opening for an electromagnetic wave in ITS communication such as ETC and VICS. The area of the opening (5 in FIG. 4) may be at least 9 cm². A transmitter/receiver can be placed in the opening on the inside of an automobile, whereby the above-mentioned communication may be conducted. When the area of the opening is smaller than the above value, the region for receiving/transmitting is influenced by an electromagnetic shielding function of the conductive film, which may cause a defect in communication.

(Ceramic Print)

Figure 5:
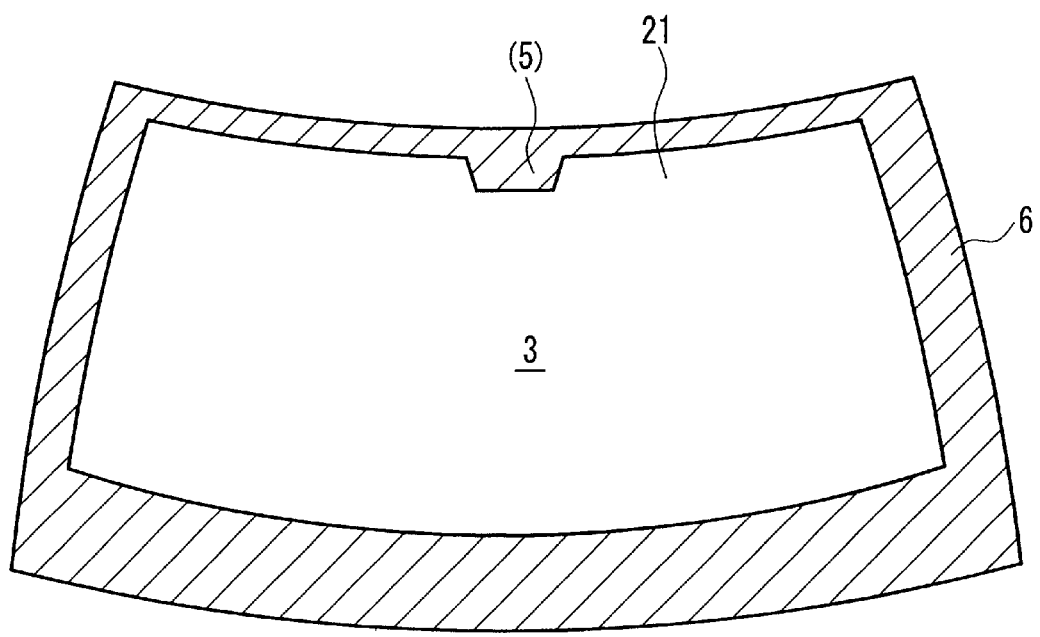
FIG. 5 is a view illustrating a configuration example of a ceramic mask (masking print) in the present invention.

In order to enhance the outer appearance characteristics of a laminated glass sheet for a windshield, it is preferable that a ceramic print is formed in a peripheral portion of the laminated glass sheet. At this time, it is preferable that the ceramic print is formed so as to cover the protruding portion as well as other portions of the bus-bar. It becomes difficult to visually recognize the bus-bar portions, which is preferable. FIG. 5 shows an example of this case, which corresponds to the case in FIG. 2A.

Furthermore, any ceramic print not containing a metal component is preferable since there is no attenuation of an electromagnetic wave in the opening for communication.

Figure 6:
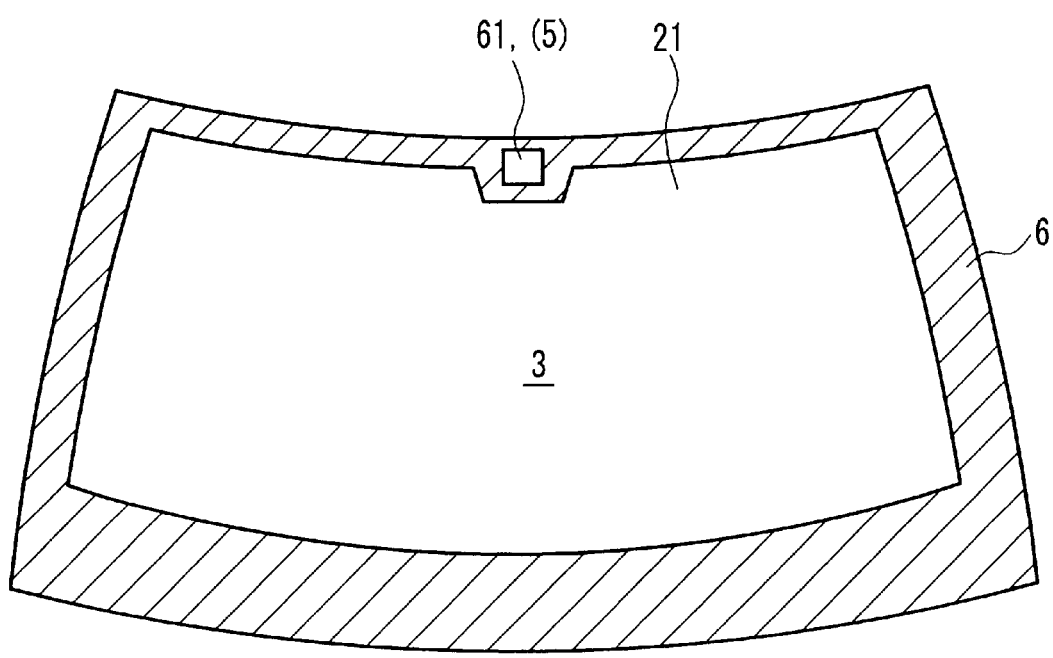
FIG. 6 is a view illustrating another configuration example of a ceramic mask in the present invention.

If the ceramic print 6 contains a metal component, an opening where the ceramic print is not formed should be provided in the concave portion. In this case, a transmitter/receiver should be set so as to be in contact with the opening 61 in view of the outer appearance. FIG. 6 shows an example of this case, which corresponds to the case in FIG. 2B.

Even in the case where a rain sensor, a CCD camera, or the like utilizing visible light and an infrared ray is set as communication equipment, an opening where the ceramic print is not formed should be provided.

Hereinafter, a specific example will be described. In this specific example, the basic film configuration 1 was used as the transparent conductive film.

First, a transparent conductive film was formed over the entire surface of a region corresponding to a field of view of windshield. As shown in FIG. 6, the opening 61 of the ceramic print in the region 5 for electromagnetic communication was a square with a side of 30 mm.

Furthermore, a current was allowed to flow under the condition that the resistance between terminals of the bus-bar electrodes of the resultant windshield was about 2Ω, and an applied voltage between the bus-bars was 42 V.

The heat-generation temperature was 90° C. or less in a region where the conductive film was formed, and a frost and a fog were removed effectively. At this heat-generation temperature, there was no possibility of overheating.

Furthermore, an antenna for ETC (5.8 GHz) was set on the inside of the windshield in the opening for communication so as to be close to the windshield, whereby antenna characteristics were checked. It was found that the antenna characteristics are equal to those in a general windshield having no conductive films, and there is no influence on communication.

As described above, according to the present invention, the shape of a bus-bar is modified in the laminated glass sheet for a windshield, whereby a transparent conductive film having an electromagnetic shielding function is not formed partially. Then, the region where the conductive film is not formed can be used as an opening for communication such as ETC and VICS.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A laminated glass sheet for a windshield comprising at least two glass sheets, at least one thermoplastic resin film provided between the at least two glass sheets, and a transparent conductive film and bus-bars for supplying electric power to the transparent conductive film, the transparent conductive film and the bus-bars being formed on a surface of one of the glass sheets, wherein the bus-bars comprise a first bus-bar arranged along an upper end of the laminated glass sheet, and a second bus-bar arranged along a lower end of the laminated glass sheet, and wherein the first bus-bar comprises a protruding portion that has an inverted trapezoid shape and extends toward the second bus-bar, and the transparent conductive film is not formed in a concave portion that is formed by the protruding portion.

2. The laminated glass sheet according to claim 1, wherein the transparent conductive film is free from an opening.

3. The laminated glass sheet according to claim 1, wherein the ceramic print has an opening in said concave portion.

4. The laminated glass sheet according to claim 1, wherein the transparent conductive film comprises a metal layer.

5. The laminated glass sheet according to claim 4, wherein the transparent conductive film further comprises an indium tin oxide (ITO) layer.

* * * * *